United States Patent [19]
Garfinkle et al.

[11] Patent Number: 5,994,649
[45] Date of Patent: Nov. 30, 1999

[54] PORTABLE WEIGHING DEVICE FOR THE MOBILITY-DISABLED

[76] Inventors: Moishe Garfinkle, P.O. Box 15855, Philadelphia, Pa. 19103; Todd Zielinski, 5413 Quentin St., Philadelphia, Pa. 19128

[21] Appl. No.: 08/730,073

[22] Filed: Oct. 15, 1996

[51] Int. Cl.[6] .......................... G01G 19/22; G01G 21/00; G01G 21/22
[52] U.S. Cl. ...................... 177/25.11; 177/126; 177/253; 177/262
[58] Field of Search ..................................... 177/126, 127, 177/132, 133, 136, 144, 148, 145, 161, 211, 229, 253, 262, 45, 50, 25.11, 25.12, 25.13, 15.14, 199, 187, 188

[56] References Cited

U.S. PATENT DOCUMENTS

| | | | |
|---|---|---|---|
| 1,479,581 | 1/1924 | Berry | 177/136 |
| 1,936,178 | 11/1933 | Sykes | 177/136 |
| 2,269,969 | 1/1942 | Branick | 177/126 |
| 3,961,675 | 6/1976 | Siegel | 177/126 |
| 4,650,016 | 3/1987 | Sinjeokov Andriewsky | 177/211 |
| 4,660,662 | 4/1987 | Katz | 177/50 |
| 4,691,794 | 9/1987 | Larsen et al. | 177/211 |
| 5,270,494 | 12/1993 | Davis | 177/25.14 |
| 5,414,225 | 5/1995 | Garfinkle | 177/199 |

*Primary Examiner*—Randy W. Gibson

[57] ABSTRACT

A portable weighing device comprising two laterally displaced, electrically connected and rigidly aligned weighing modules is disclosed that permits convenient weighing of the mobility-disabled while occupying a conventional manually-operated wheelchair supported by two front caster wheels and two rear main wheels. The weighing platforms are so contoured that the wheelchair wheels can roll smoothly onto and off of the weighing platforms without disturbing the weighing device. The weighing device fully guides the operator through the sequence of steps required to weight the occupant of a wheelchair.

4 Claims, 12 Drawing Sheets

PORTABLE WEIGHING DEVICE FOR THE MOBILITY-DISABLED

BACKGROUND OF THE INVENTION

The number of mobility-disabled in America is now well over two million of which almost 1½ million are confined to wheelchairs. Although such persons are health-conscious even simple medical procedures such as weighing themselves can become quite difficult at their residences. Such an ostensibly simple procedure can be in fact quite involved because the weighing device must accommodate the wheelchair, which generally requires ramps and a platform scale. As such wheelchair users ordinarily can only be weighed at a physician's office or clinic with a platform scale, which is rarely more than once a month. Such infrequent weighings renders weight control programs quite difficult to maintain. In addition to those using wheelchairs, often those requiring crutches or walkers must be seated in wheelchairs for weighing as they have difficulty balancing themselves on ordinary scales.

Because of their size platform scales are generally found only in clinics with a significant number of mobility-disabled patients, such as rehabilitation centers. Consequently, physicians rarely have office platform scales, not only because such scales occupy such a disproportionate amount of floor space in relation to their usage, but even with foldable ramps, such scales occupy valuable storage space. Hence, the mobility-disabled must often travel further distances than necessary to equipped clinics for even routine medical treatments inasmuch as such treatments generally includes weight measurements. Although physician's weighing chairs are available with built-in scales, those confined to wheelchairs find it inconvenient and even annoying to have to be transferred from one chair to another and then back for a procedure as routine as weighing.

In terms of those facing this problem the number of the wheelchairs users in America has almost doubled from some 720,000 in 1980 to over 1,400,000 in 1990 during a decade in which the general population had increased only 10%. Moreover, this utilization figure does not take into account users of crutches and walkers, which altogether number well over 2,000,000, most of whom require special aids in weighing.

Not only are the number of wheelchair users increasing, but the largest number of wheelchair users are the elderly, the fastest growing segment of our population. This group should continue to increase faster than the general population for the foreseeable future.

OBJECTIVE OF THE INVENTION

Figures 1A, 1B:
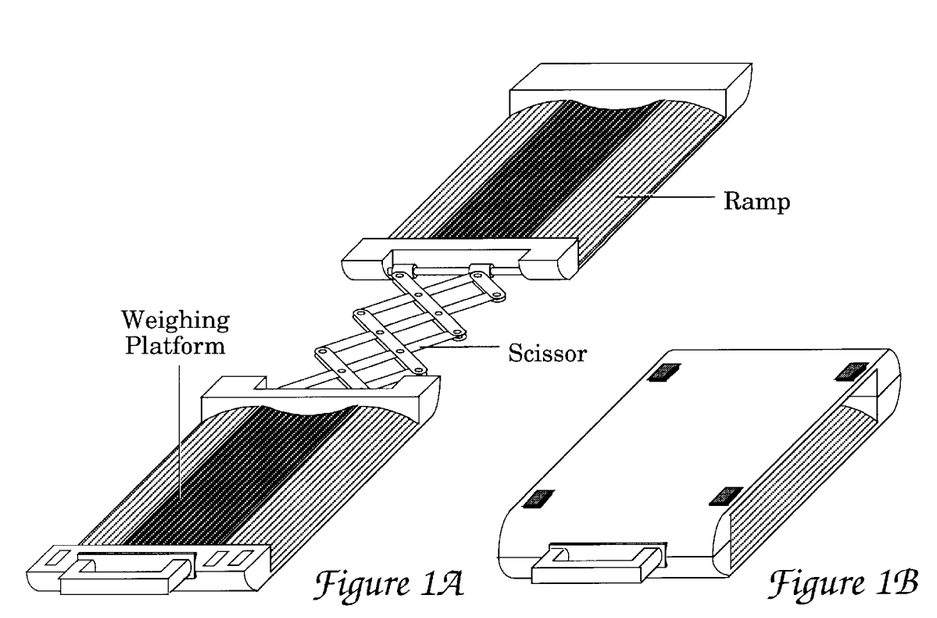
FIG. 1A: Weighing device deployed.
FIG. 1B: Weighing device folded.

In response to the deficiencies inherent in available weighing systems for the mobility disabled the portable weighing device comprising two laterally displaced, electrically connected and rigidly aligned weighing modules illustrated in FIGS. 1A and 1B is disclosed which permits convenient wheelchair weighing of the disabled. The weighing device can be battery powered and is designed for the conventional manually-operated wheelchair supported by two front caster wheels and two rear main wheels.

FIG. 1A shows the weighing device deployed. The caster wheels are first rolled up the integral ramps onto the concave weighing platform. The portions of the weight of the wheelchair supported by the caster wheel is measured. The main wheels are then rolled onto the concave weighing platform. The portions of the weight of the wheelchair supported by the main wheel is then measured. The portions of the weight of the wheelchair supported by each wheel are successively summed and the chair weight is electronically subtracted. The weight of the occupant is then displayed.

FIG. 1B shows the weighing device folded for carriage or storage. Accordingly, with the weighing device wheelchair users can be conveniently weighted at hospitals, rehabilitation centers, physician's offices or hospital clinics by staff or alternatively can weight themselves at their residence.

However certain difficulties are encountered when 1) moving a heavy occupied wheelchair up the ramps,
2) positioning the wheels on the weighing platform, and
3) operating the device.

The ramp difficulty concerns the excessive pushing force that must be imposed on a wheelchair at the ramp edge of a weighing device so as to lift the caster wheels onto the ramps. The positioning difficulty concerns the clearance of the main wheels on the weighing platforms. The operating difficulty relates to the need to make two independent and successive readings using a portable weighing device to arrive at the weight of the wheelchair occupant.

BRIEF DESCRIPTION OF THE DRAWINGS

FIG. 6PF: Main Program Flow.
FIG. 6MM: Main Measurement Subroutine.
FIG. 6MT: Main Tare Branch.
FIG. 6PA: Platform Averaging Subroutine.
FIG. 6CR: Coefficient Recalibration Branch.
FIG. 6MP: Measure Platforms Subroutine.

Mechanical and circuitry details are not described as they are well known to those knowledgeable in the art, as are the technical details of the central processing unit.

PREFERRED EMBODIMENT OF THE INVENTION

Figure 2A:
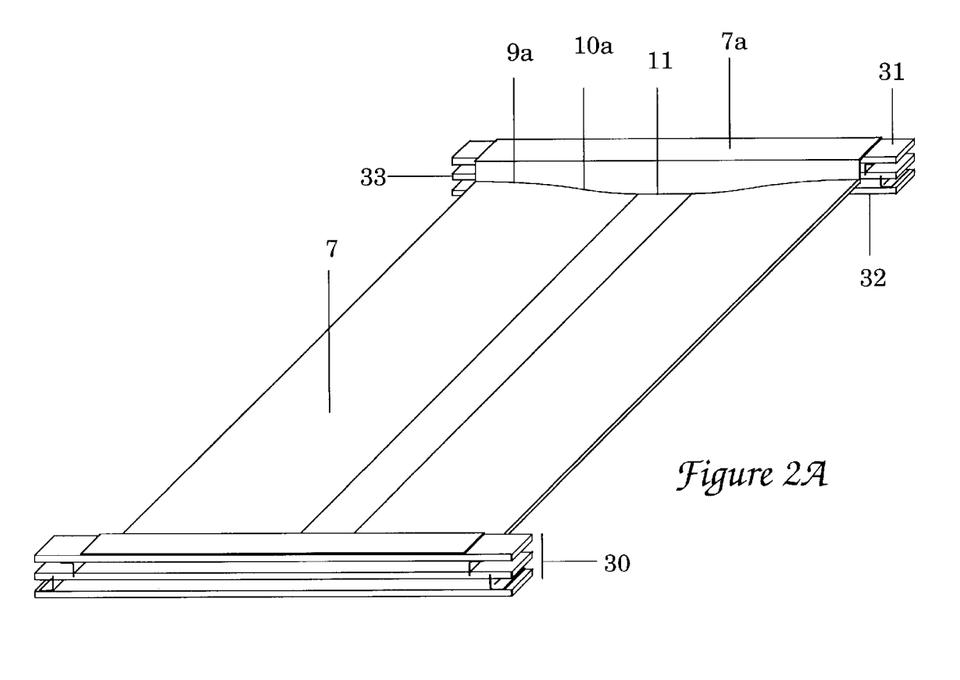
FIG. 2A: Weighing platform and suspension.
Figure 2B:
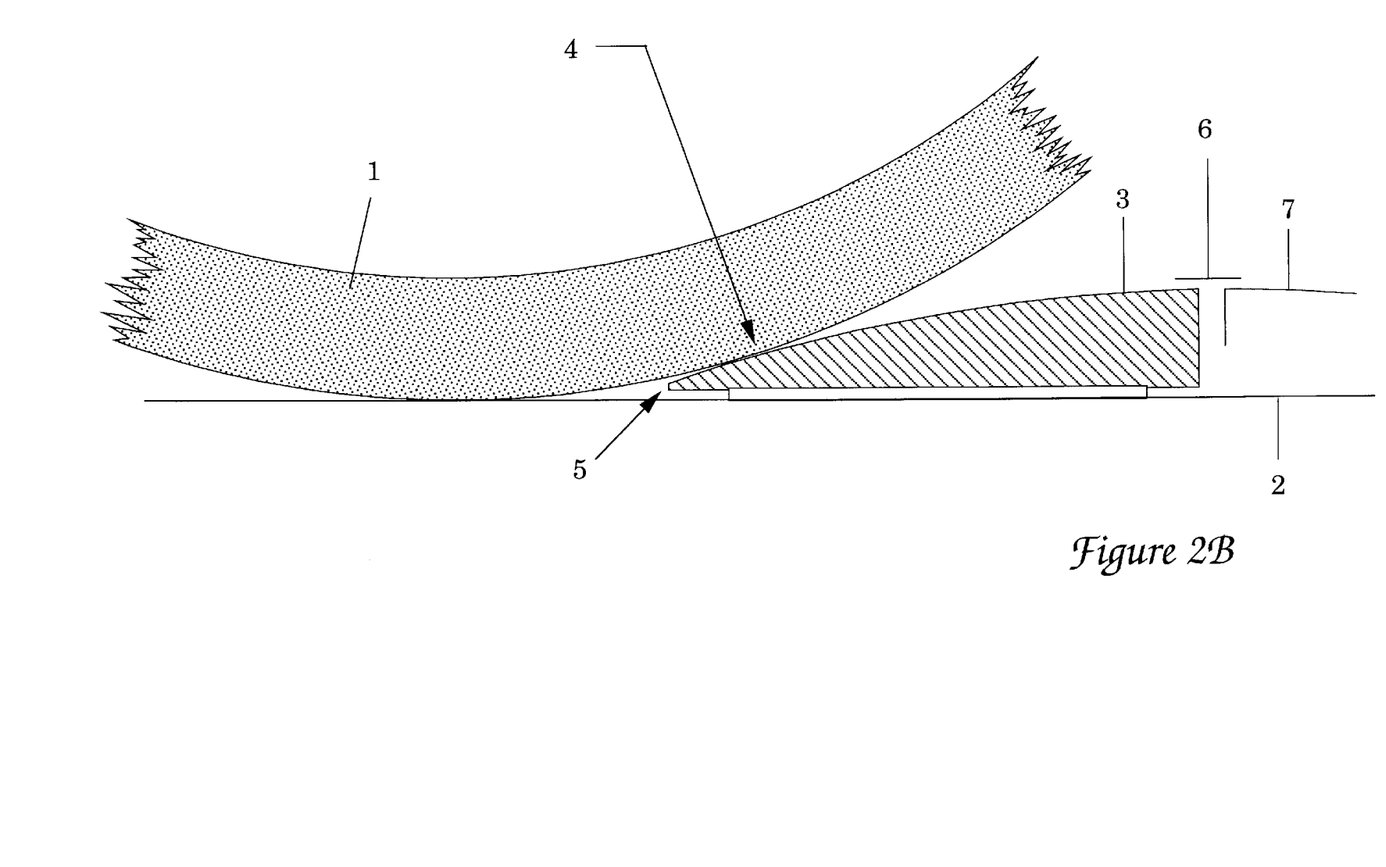
FIG. 2B: Ramp Contour

Referring to FIGS. 2A and 2B, consider first the ramp difficulty. Caster wheel 1 of an ordinary wheelchair rests on floor 2 and is in contact with the ramp 3 at contact point 4. Experience has demonstrated that if the contact point 4 occurs at the ramp edge 5 rather than on the surface of ramp 3, the wheel will jolt the weighing platform and the wheelchair occupant. If the wheelchair load is sufficiently great, the contact of wheel 1 with edge 5 will require a heavy pushing load to move the wheel 1 onto ramp 3, possibly shifting the weighing platform.

According to this invention this difficulty is eliminated with the caster wheel 1 as shown passing over the ramp edge 5 and contacting the ramp 3 at point 4. Consequently the load required to push the caster wheels 1 of the wheelchair will smoothly increase as the ramp 3 assumes the wheelchair load at contact point 4. The ramp 3 contour is a conic or similar section convex upward and consequently the pushing load to move the wheelchair smoothly diminishes as the slope of ramp 3 diminishes to zero at the top of ramp 3. The wheelchair can then roll smoothly over the hump 6 and onto the weighing platform 7. Otherwise, on a flat ramp the pushing load will remain essentially constant as the caster wheels 1 climbs a flat ramp, resulting in an abrupt acceleration as the wheelchair passes over the hump 6 and onto the weighing platform 7, jolting the portable weighing platform and wheelchair occupant as the wheel 1 strikes the opposite side of platform 7.

While the ramp problem is also present with heavy platform scales, such heavy scales can readily tolerate the jolt accompanying the accelerated start required to mount caster wheels over the edge of its ramp, though the jolt can be discomforting to a wheelchair occupant. Essentially, the portable weighing device must be sufficiently light so as to be portable, but nevertheless must be capable of measuring loads several magnitudes greater than its own weight. In contrast, platform scales are stationary and consequently can be heavy and unwieldy and therefore need measure loads only several times greater than their own weight. Hence the ramp difficulty is specific to a portable weighing device.

Figure 2C:
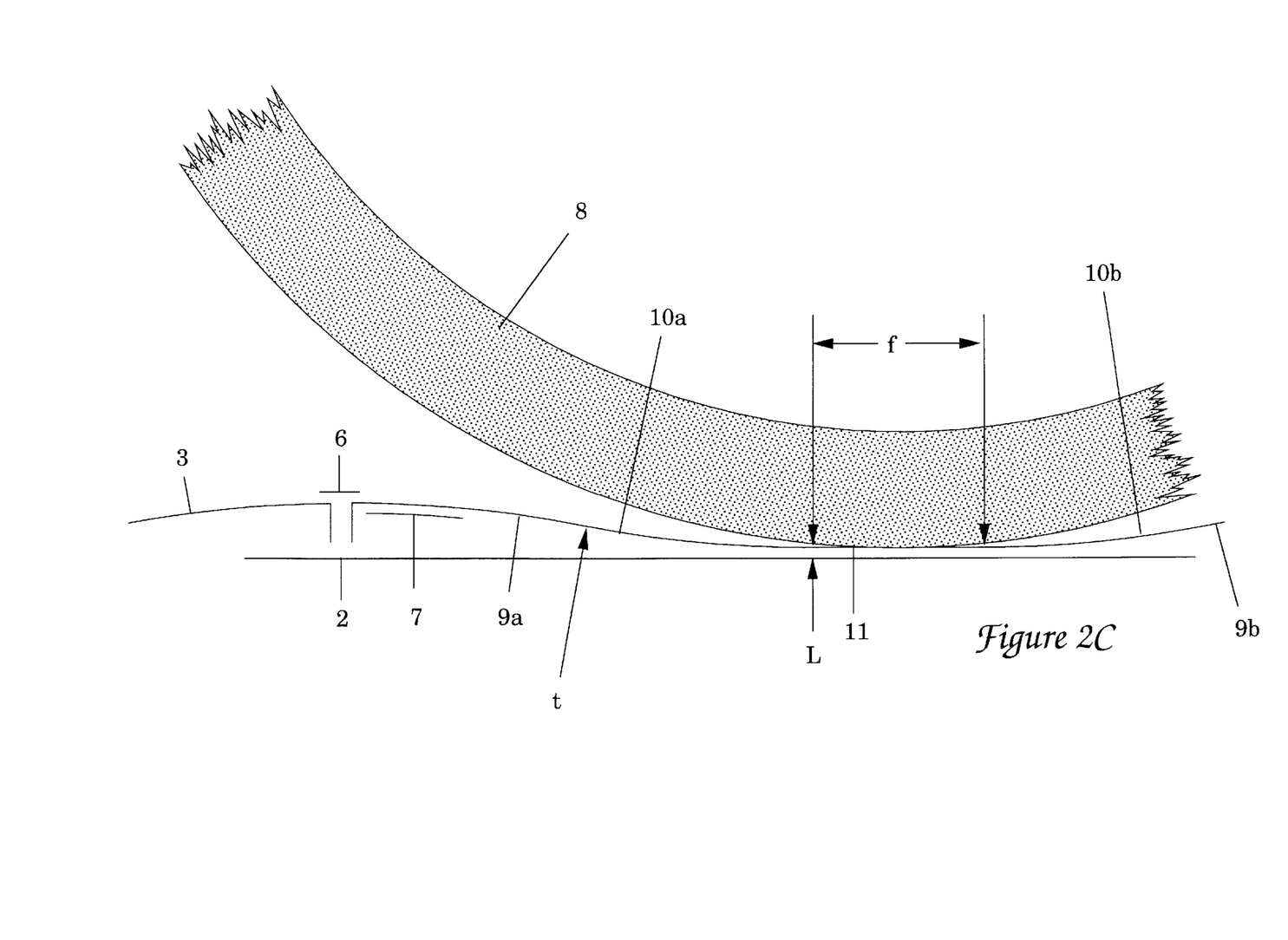
FIG. 2C: Platform Contour.

Referring to FIGS. 2A and 2C, consider now the positioning difficulty, which is compounded because the wheels on the platforms are elevated above floor level by distance L. Hence the wheelchair tilts during weighing which introduces an error in the weight reading. When the caster wheels 1 are on the platforms, the wheelchair tilts backward, shifting the center-gravity-of the wheelchair backward, reducing the weight supported by the caster wheel, resulting in a light reading. When the main wheels 8 are on the platforms, the wheelchair tilts forward, shifting the center-gravity-of the wheelchair forward, reducing the weight supported by the mail wheels, and again resulting in a light reading.

Consequently, as a result of wheelchair tilt a portable weighing device will ostensibly read light. Fortunately, if the elevation L is less than roughly three millimeters above floor level for ordinary wheelchairs with wheelbases between 35 and 45 cm the weighing discrepancy becomes insignificant: less than the circadian weight variation of a normal individual.

The contour of the weighing platform 7 comprises conic or similar sections 9a and 9b and sections 10a and 10b. Section 9a adjacent to ramp 3 is convex upwards and tangent to ramp 3 at gap 6, permitting a smooth transition from ramp 3 to platform 7. Section 10a is concave upwards and tangent to section 9a at tangent line t, permitting a smooth transition from section 9a to section 10a as on the opposite side of platform 7 with sections 9b and 10b.

Sections 10a and 10b have essentially identical contours, but the contour of platform 7 is not continuous between sections 10a and 10b. An essentially flat section 11 is interposed between sections 10a and 10b. Section 11 is interposed because wheels 1 or 8 must be at the lowest position on platform 7 to minimize elevation L If sections 10a and 10b were a continuous conic section, then the lowest position on platform 7 is defined by a line along the center of platform 7. Inasmuch as any small irregularity in floor 2 that might minimally hinder motion of wheels 1 or 8 on floor 2 would displace wheels 1 or 8 from the lowest position on platform 7, the inclusion of flat 11 eliminates this concern. The flat section 11 defines the lowest position not as a line across the platform but as an area. Accordingly small displacements of wheels 1 or 8 from the center position still allows wheels 1 or 8 to occupy the lowest position, minimizing elevation L. Hence the positioning difficulty is specific to a portable weighing device.

Because the weighing platform 7 is contoured concave downwards a wheelchair accelerates on section 10a towards the bottom of the platform 7 at flat 11. Hence section 10b on the opposite side of the platform must arrest the motion of the wheelchair lest the wheelchair simply rolls off the opposite edge of platform 7. This deceleration of the wheelchair on platform 7 imposes a longitudinal load which is carried from platform support plate 7a to suspension 30 shown in FIG. 2A.

Figures 3A, 3B, 3C, 4A, 4B, 4C, 4D:
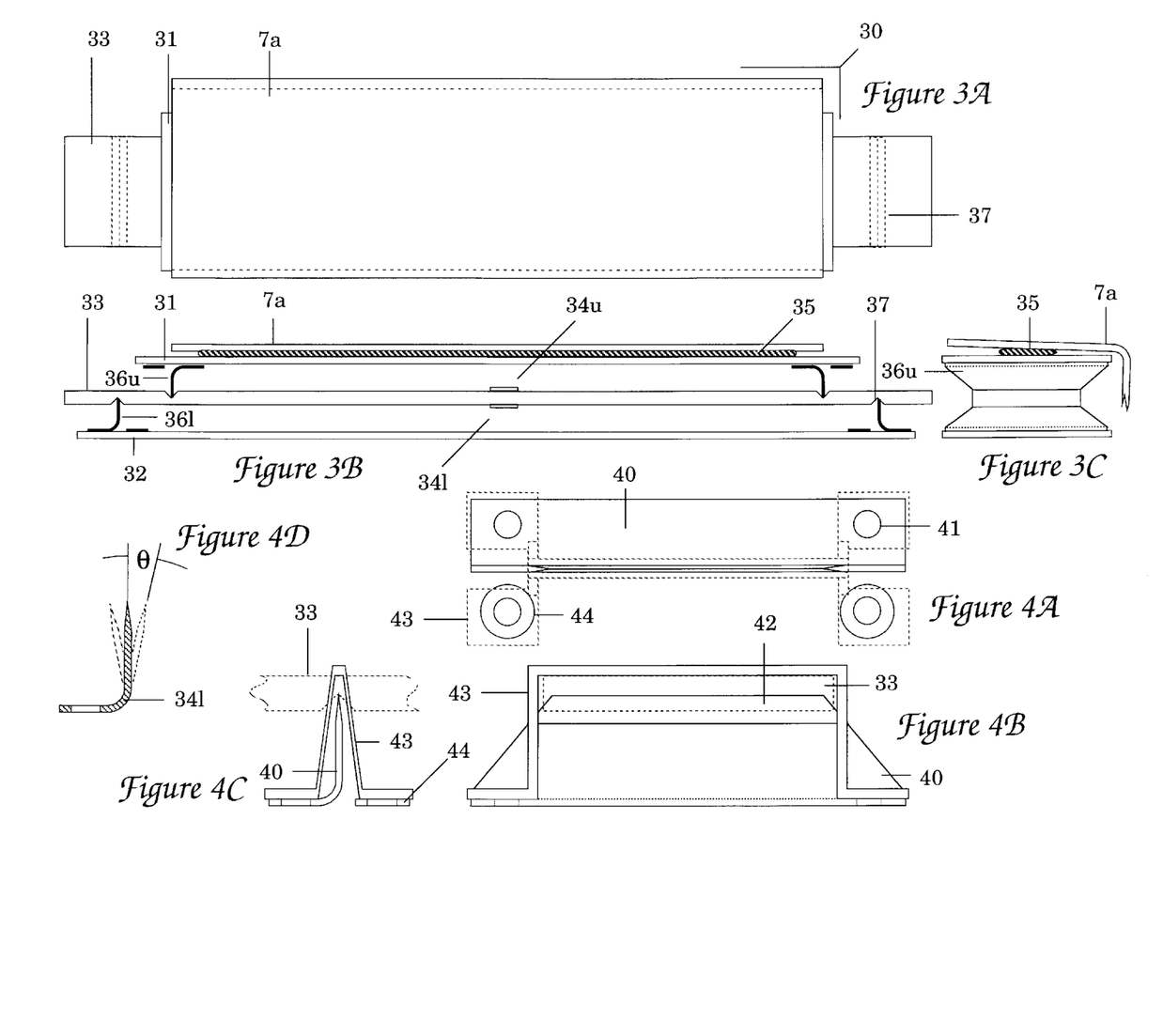
FIG. 3A: Suspension, top-view.
FIG. 3B: Suspension, side-view.
FIG. 3C: Suspension, end-view.
FIG. 4A: Flexural knife, top-view.
FIG. 4B: Flexural knife, side-view.
FIG. 4C: Flexural knife, end-view.

As illustrated in FIGS. 3A, 3B, and 3C, the suspension 30 comprises an upper support plate 31, a lower support plate 32, and a deflection beam 33 upon which is secured upper and lower strain gauge transducers 34u and 34l respectively, at the center of flexural beam 33. The load imposed by plate 7a of weighing platform 7 is carried through elastomeric element 35 to plate 31 to which is secured upper flexural knives 36u. Knives 36u contact deflection beam 33 at lateral V-notches 37. The deflection of beam 33 impose by the vertical load on knives 36u and 36l results in a compressive strain on gauge 34u and a tensile strain on gauge 34l. These strains result in a change in resistance of the gauges proportional to the load on platform 7 which can be detected by appropriate circuitry.

Figures 3D, 3E:
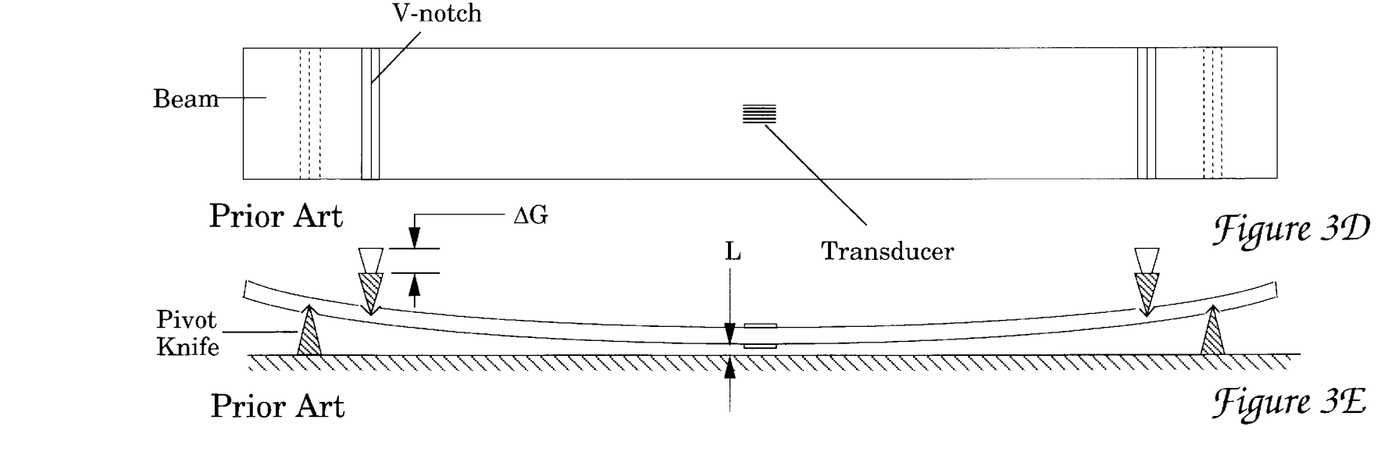
FIG. 3D: Flexural beam, prior art, top-view.
FIG. 3E: Flexural beam, prior art, side-view

The longitudinal load imposed by plate 31 on beam 33 by motion of a wheelchair causes knives 36u to elastically flex through some angle $\pm\theta$ as shown in FIG. 3D, thereby absorbing the lateral load imposed on the weighing device arising from the deceleration of the wheelchair. Lower flexural knives 36l are secured to lower support plate 32 and carry both the longitudinal and the vertical loads imposed on the deflection beam 33 to lower support plate 32.

Because weighing platform 7 is suspended between the platform support plates 7a any load on platform 7 tends to angularly deflect plates 7a, as shown in FIG. 3C. To prevent any such deflection from end loading the flexural knives 36u, the elastomeric element 35 is interposed between plate 7a and plate 31. Hence any angular deflection of plate 7a is absorbed by elastic deflection of element 35, thereby minimizing angular deflection of plate 7a and end loading of flexural knives 36u.

Figures 3F, 3G:
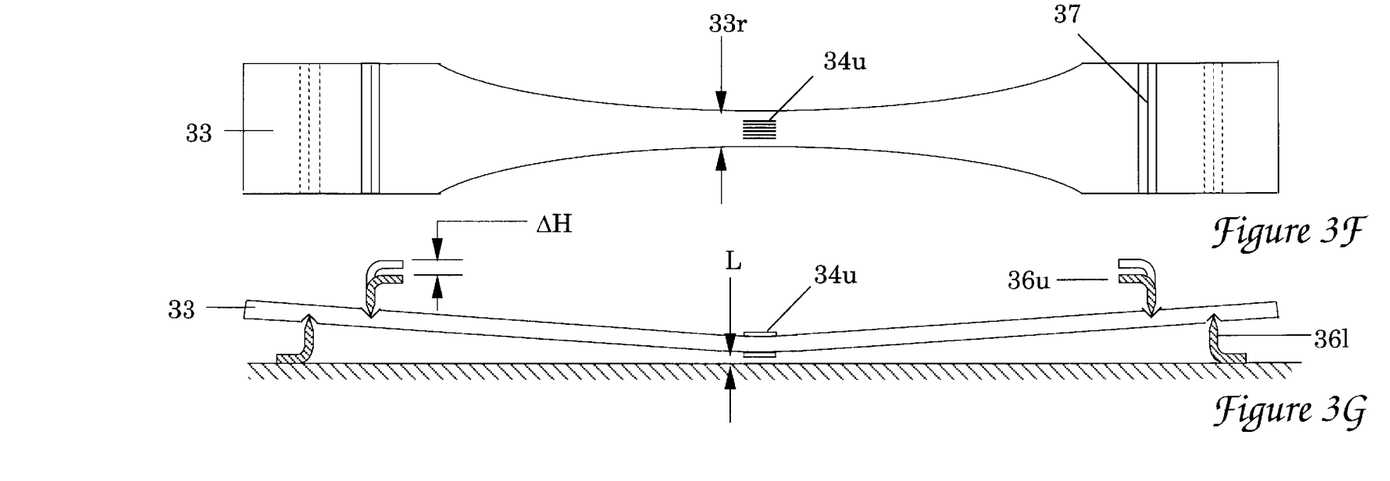
FIG. 3F: Flexural beam, top-view.
FIG. 3G: Flexural beam, side-view.

As shown in FIGS. 3D and 3E, in ordinary weighing practices the deflection beam has a simple configuration. The principal consideration in the design of the beam is that the change in strain at the transducer sites under the imposed load be sufficient to cause an adequate change in gauge resistance to properly measure the load. Because the elevation L of the beam above the floor level in ordinary practice is of no consequence the vertical displacement $\Delta G$ of the upper knives is of little concern. In contrast, as shown in FIGS. 3F and 3G, the vertical displacement $\Delta H$ of knife 36u is critical for the weighing device because the greater the deflection the greater the unloaded distance $\Delta H$ must be set to prevent bottoming of the platform 7 under maximum load, thereby increasing the platform height L and increasing the weighing error caused by wheelchair tilt. To both maximize the strain of gauge 34u and 34l and minimize vertical displacement of knives 36u under load the beam 33 is contoured, with the gauges 34u and 34l located at the reduced section 33r. Hence the bending of beam 33 is concentrated at the reduced section, maximizing the strain at gauges 34u and 34l, with ΔH<ΔG.

Referring to FIGS. 4A, 4B and 4C: The configuration of flexural knives 34u and 34l are essentially identical. The flexural knives 36u and 36l comprise angular body member 40 with holes 41 for fastening knife 36u to upper support plate 31 and for fastening knife 36l to lower support plate 32, and knife edge 42. Elastic retainer 43 preloads deflection beam 33 to maintain the position of beam 33 on knife edges 42 without interfering with the deflection of beam 33 under longitudinal or vertical loading, preventing relative motion.

Spacer 44 maintains the retainer 43 at a uniform space from the support plates 31 and 32 to facilitate fastening. To absorb longitudinal loading of the suspension 30 by wheelchair deceleration, knives 36u and 36l can flex through an angle θ as shown in FIG. 4D, ameliorating the loading.

Figure 5A:
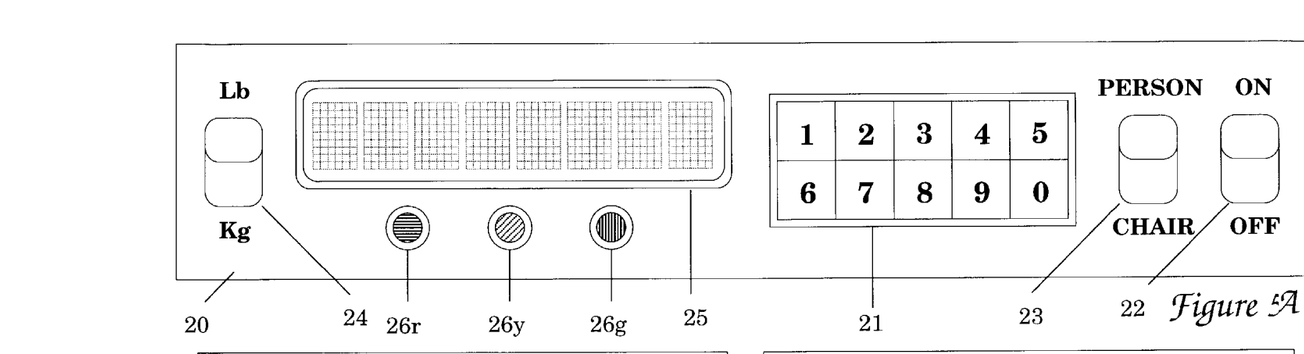
FIG. 5A: Weighing device control panel.
Figures 5B, 5C:
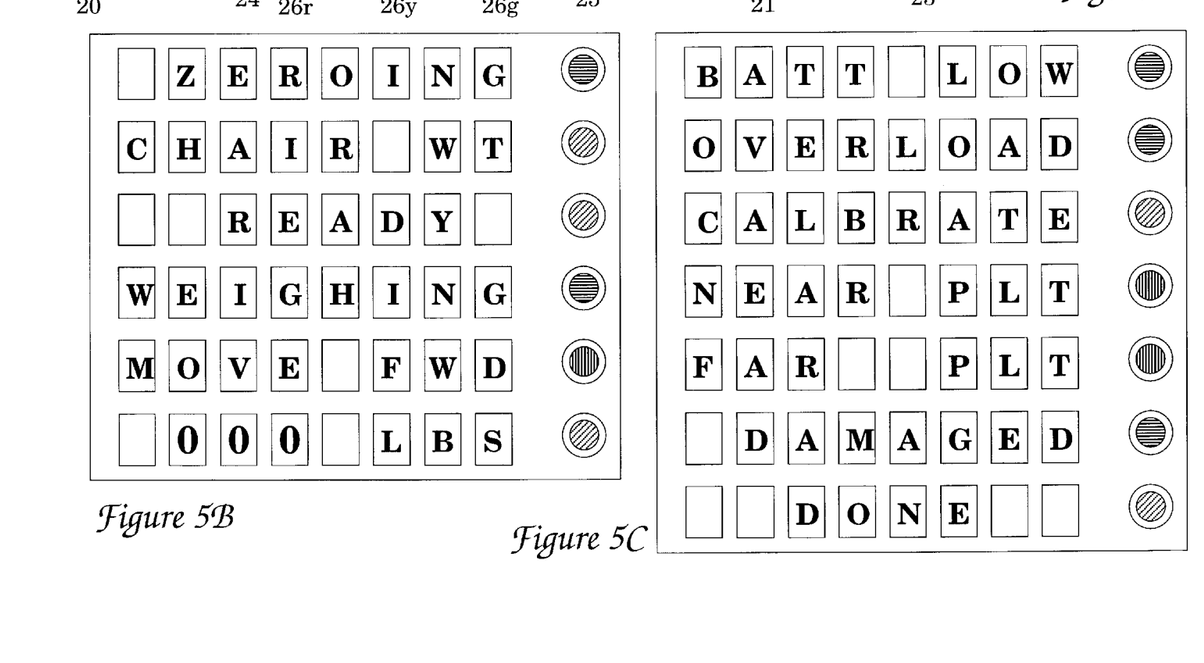
FIG. 5B: Display messages.
FIG. 5C: Display messages.

Referring to FIG. 5A, consider now the operating difficulty which arises because a portable weighing device requires two independent and successive weighing, often in a noisy and hectic environment. Experience has taught that unless the action required for such a task are both specified and easily recognized, the successful completion of this task by the operator is often frustrated. The requirements to guide the operator have been met with the portable weighing device by both an annunciator and an indicator controlled by a central processing unit. The annunciator is an electronic display and the indicator is a series of colored lights. The control panel 20 has several information input and output devices. The four input devices comprise a keypad 21 and three switches: the power switch 22, the mode switch 23 and the scale switch 24. The four output devices comprise an annunciator 25 with an eight alphanumeric-character display and three indicator lights: red26r, yellow26y, and green26g. As shown in FIGS. 5B and 5C, the messages displayed by the annunciator 25 are keyed to the indicator lights26r,26y, and 26g. In addition, a momentary audible signal is sounded whenever the indicator color changes.

FIGS. 5A and 5B, illustrate the messages required to be displayed by annunciator 25 and the associated color displayed by the indicator lights to indicate the current operating mode of the weighing device. the red light 26r indicates that an internal procedure is being conducted, and that the weighing device must not be disturbed. The yellow light 26y indicates that the weighing device either is waiting for an input signal or is displaying an output signal. The green light 26g indicates that the weighing device is requesting immediate action by the operator.

Figure 6:
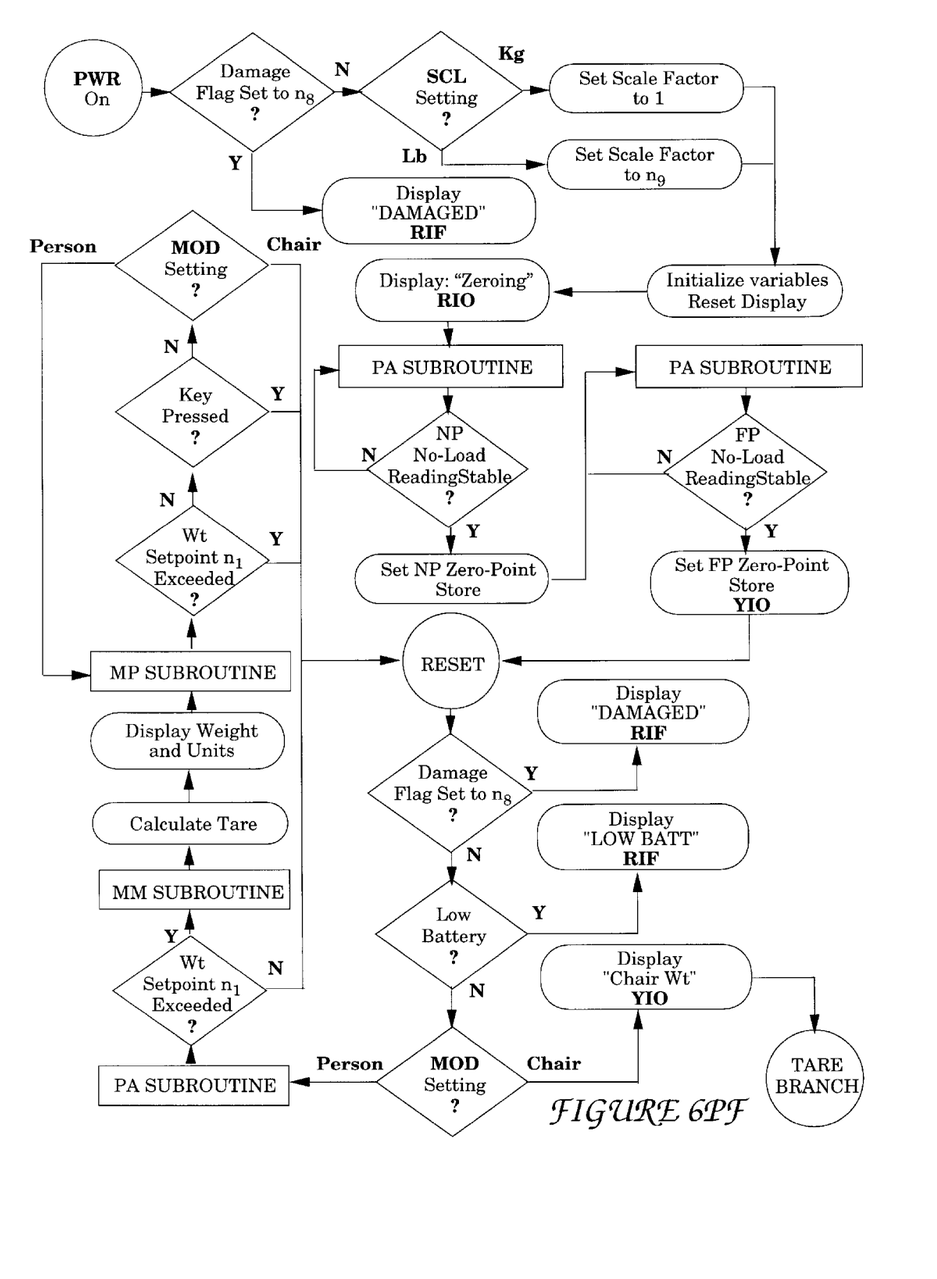

FIGS. 6PF, 6MM, 6MT, 6PA, 6CR and 6MP chart the steps performed by the central processing unit necessary for the proper operation of the weighing device. The transducers 34u and 34l produce an electric signal essentially proportional to the the imposed vertical load. This analog signal is converted to a digital signal and read by the central processing unit. The terms used to describe the prescribed operating steps performed by the central processing unit in response to input signals from the transducer 34u and 34l signals, the keypad 21 and the setting of the three switches 22, 23 and 24 are defined below.

Logic: N: no; Y: yes;
Switches: PWR: Power Switch Settings: "On", "Off";
MOD: Mode Switch Settings: "Person", "Chair";

SCL: Scale Switch Settings: "Lb", "kg",
Indicators: RIO: red indicator on;
RIF: red indicator flashing;
YIO: yellow indicator on;
GIF: green indicator flashing;
Platforms: NP: Near platform relative to control panel;
FP: Far platform relative to control panel;
Routines: MM: Main Measurement Subroutine;
MT: Main Tare Branch;
PA: Platform Averaging Subroutine;
CR: Coefficient Recalibration Branch;
MP: Measure Platforms Subroutine;
Set Points: $n_1$: Minimum weight setting for actuation;
$n_2$: Maximum weight difference between two successive readings;
$n_3$: Calibration code;
$n_4$: Overload weight setting;
$n_5$: Number of weighing to be averaged;
$n_6$: Damage weight setting;
$n_7$: Calibration weight;
$n_8$: Damage flag value.
$n_9$: Scale Factor.

The Main Program Flow shown in FIG. 6PF is the primary loop followed by the central processing unit for operation of the weighing device and essentially coordinates the sequence of steps performed by the dependent subroutines and branches. The weighing device is activated by Power Switch 22. With the chair weight previously entered the no-load condition is met when the loads on each platforms 7 are less than $n_1$. Under these conditions the portable weighing device self-zeros while displaying "Zeroing" with RIO. The resistance changes of the transducers 34u and 34l in a bridge circuit for each platform are linearly proportional to the load on each platform, and their resistance under no-load conditions are used as the zero value. Temperature changes, which alters both electrical resistances and mechanical dimensions, are the principal reason no-load readings drifts from zero. The SCL switch 24 is set to either Lb or Kg. On the completion of zeroing "Ready" is displayed with YIO and the device is ready for weighing. If battery output drops below appropriate operating level "Low Batt" is displayed with RIF, precluding further operation of the weighing device.

If the MOD switch 23 is set to PERSON the normal weighing routine can be initiated with YIO. When the caster wheels of the occupied wheelchair are rolled onto the platforms 7 the platform loads exceeds $n_1$ and the MM subroutine charted in FIG. 6MM calculates the loads on each platform 7 using the PA subroutine of FIG. 6PA. The caster wheel load is calculated by the PA subroutine by taking $n_5$ number of discrete load readings and averaging the $n_5$ readings. This operation is then repeated by the MM subroutine and another average of $n_5$ readings is taken by the PA subroutine. If the two successive averages agree with one another within a difference of $n_2$, the last average is placed in storage as the caster wheel load. If the averages do not agree another $n_5$ readings are made by the PA subroutine and another average calculated. This last average value is then compared to the previous average by the MM subroutine. During this process "Weighing" is displayed with RIO, indicating that the wheelchair is not to be disturbed. This process is continued until the last two averages calculated agree to within $n_2$. "Move Fwd" is displayed with GIF.

This load determining process is repeated when the main wheels of the occupied wheelchair are rolled onto the platforms 7. The platform loads exceeds $n_1$ and the MM subroutine charted in FIG. 6MM calculates the loads on each platforms 7 using the PA subroutine of FIG. 6PA. Again if succeeding averages agree with one another within a difference of $n_2$, the last average is placed in storage as the main wheel load. The caster and main wheel loads are summed and stored as the occupied wheelchair load. "Move Fwd" is displayed with GIF until load is removed. The weight of the chair is subtracted from the occupied wheelchair weight and the difference displayed as the occupant weight. The weighing device resets for another weighing.

Of course the loads read by the portable weighing device must be converted to weight units, either pounds or kilograms. This operation is performed by the MP subroutine charted in FIG. 6MP. First the no-load resistance reading for each platform 7 is subtracted from the resistance reading under load and then the resultant load is divided by a Conversion Coefficient for each platform 7 and the sum multiplied by a Scale Factor for either pounds or kilograms. The Conversion Coefficients and Scale Factor are held in storage and are used to convert resistance reading to appropriate weight units.

If the MOD switch 23 is set to CHAIR "Chair Wt" is momentarily displayed and either of two empty chair weighing operations initiate as shown in the MT branch charted FIG. 8. If the platform 7 loads do not exceed $n_1$ then using the keypad 21 the value of the wheelchair weight can be entered and replaces the previous value held in nonvolatile storage. If the platform 7 loads exceeds $n_1$ then the keypad 21 is bypassed, indicating that the empty wheelchair is to be weighed. The empty wheelchair weighing routine is essentially the same as for an occupied wheelchair, except that the value of the wheelchair weight replaces the previous held in storage.

There is some small possibility that the value of the Conversion Coefficient might change over a period of time, generally from unanticipated resistance change in the transducers 34u and 34l or circuit components. The portable weighing device can be field recalibrated. If the value of the calibration code $n_3$ is entered in the keypad 21 with the MOD switch 23 set to CHAIR "Calbrate" is momentarily displayed. The Conversion Coefficient for each platform 7 is then recalibrated using the CR branch charted in FIG. 10. When "NearPlat" is displayed a standard calibration weight $n_7$ is placed on the near platform 7. The near platform 7 Conversion Coefficient is then recalculated. When "Far Plat" is displayed the standard calibration weight $n_7$ is placed on the far platform 7. The far platform 7 Conversion Coefficient is then recalculated. The MOD switch 23 is then toggled to PERSON and then back to CHAIR and the empty chair weight reentered. Normal operation can then resume.

The PA subroutine of FIG. 9 has two additional functions. If any load reading exceeds placard setpoint $n_4$ then "OVERLOAD" is displayed with RIF. The weighing device can be reset only after removing the load and restarting. If any load reading exceeds setpoint $n_6$ then "DAMAGED" is displayed with RIF. The weighing device is permanently disabled by damage flag value $n_8$. As long as the flag value remains as originally set, device operates normally. As shown in FIG. 6PF, if the damage flag value changes to $n_8$, the device only displays "DAMAGED" with RIF at restart.

While there have been described what is at present considered to be the preferred embodiment of the weighing device for the mobility-disabled, it will be obvious to those skilled in the art that various changes and modifications may be made therein without departing from the invention, and it is the objective therefore in the appended claims to cover all such changes and modifications as fall within the true spirit and scope of the invention.

What is claimed is:

1. The contoured ramp members for a foldable portable weighing device for the mobility disabled, said weighing device comprising laterally displaced, electrically connected and rigidly aligned weighing modules, each said weighing module comprising contoured ramp members for wheelchair and occupant access, contoured weighing platform member for weighing said wheelchair and occupant, suspension for weight measurement, and electronic circuitry for weight reading;said ramp member contoured with a conic or similar section, convex surface upwards with slope essentially zero at top of said ramp, said ramp sloped such that first contact between either caster or main wheels of a wheelchair and said ramp member is made at the said upward convex surface rather than at the edge of said ramp, wherein said wheels smoothly pass over said ramp edge, thereby eliminating jolting of said wheelchair and of said portable weighing device.

2. The contoured weighing platform member of the foldable portable weighing device according to claim 1, whereupon said caster wheel or said main wheel of said wheelchair is rolled onto said weighing platform member for weighing, the contour of said weighing platform member adjacent to said ramp member being a conic or similar section convex upwards whose slope is essentially zero at the top of said weighing platform;

the center section contour of said weighing platform member being a conic or similar section concave upwards whose slope smoothly diminishes to zero at the bottom of said weighing platform member;

whereby the wheels of said wheelchair pushed over the top of said ramp member smoothly roll down onto said weighing platform and thence to said bottom of said weighing platform;

said contoured platform thereby arresting forward motion of said wheelchair while minimizing weighing errors arising from tilt of said wheelchair.

3. The suspension for the foldable portable weighing device according to claim 1, said suspension comprising an upper and a lower set of flexural knives, each said flexural knife comprising an angular body member and knife edge, said upper set of flexural knives secured to an upper support plate and said lower set of flexural knives secured to a lower support plate, said knife edges of said upper set of flexural knives and lower set of flexural knives in pivotal contact with a deflection beam, wherein said upper set of flexural knives and said lower set of flexural knives are maintained in pivotal contact with said deflection beam by elastic retainers, thereby essentially eliminating relative motion between said knives and said beam;

said elastic retainer elastically flexing by a load imposed on said suspension in the rolling direction of a wheelchair decelerating on said weighing platforms;

thereby absorbing the load imposed on said weighing device by said deceleration.

4. The elastomeric elements of the foldable portable weighing device according to claim 3, whereupon said elastomeric element is interposed between said weighing platform and said upper support plate;

the elastic deflection of said elastomeric element thereby minimizing knife edge damage arising from end loading of said flexural knives arising from angular deflection of said platform under load.

* * * * *